July 9, 1957 L. J. LAWRENCE, SR 2,798,705
FUEL AND AIR MIXING VALVE
Filed Oct. 14, 1955 2 Sheets-Sheet 1

INVENTOR.
LESLIE J. LAWRENCE, SR.
BY
McMorrow, Berman + Davidson
ATTORNEYS

July 9, 1957 L. J. LAWRENCE, SR 2,798,705
FUEL AND AIR MIXING VALVE
Filed Oct. 14, 1955 2 Sheets-Sheet 2

INVENTOR.
LESLIE J. LAWRENCE, SR.
BY
McMorrow, Berman + Davidson
ATTORNEYS

United States Patent Office 2,798,705
Patented July 9, 1957

2,798,705

FUEL AND AIR MIXING VALVE

Leslie J. Lawrence, Sr., Renton, Wash.

Application October 14, 1955, Serial No. 540,377

1 Claim. (Cl. 261—44)

This invention relates to carburetion devices, and more particularly to an improved fuel and air mixing valve for an internal combustion engine, or for a similar device.

A main object of the invention is to provide a novel and improved fuel and air mixing valve which is simple in construction, which is automatic in operation, and which provides proper proportioning of the fuel and air in accordance with the requirements of the engine or other device with which it is employed.

A further object of the invention is to provide an improved automatic fuel and air mixing and proportioning device for use with an internal combustion engine or similar device, the improved mixing valve involving inexpensive components, being durable in construction, being easy to adjust to provide the desired proportioning of liquid fuel, or any other suitable fuel, to air over the range of working conditions of the engine, and being easy to install on an engine.

Further objects and advantages of the invention will become apparent from the following description and claim, and from the accompanying drawings, wherein:

Figure 1:
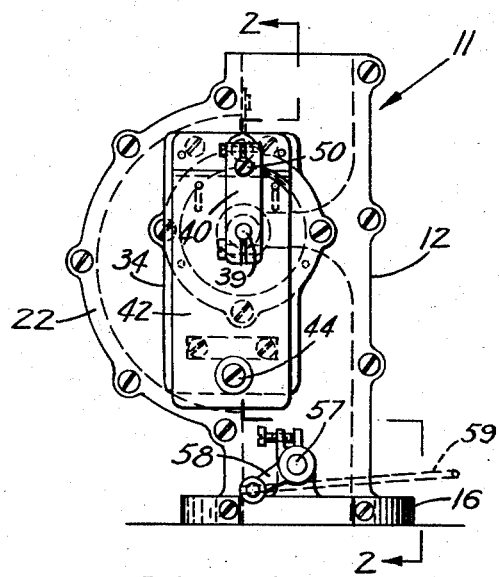
Figure 1 is a side elevational view of an improved fuel and air mixing valve constructed in accordance with the present invention.
Figure 2:
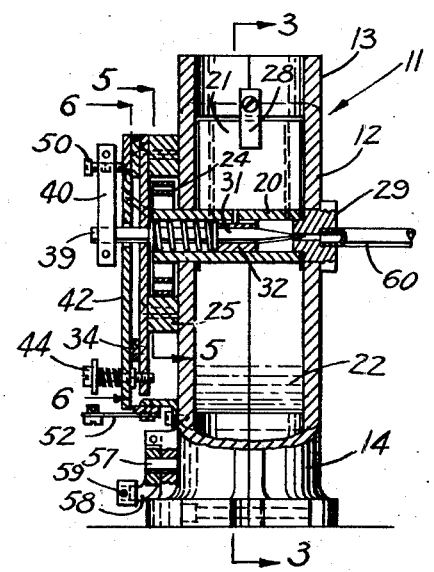
Figure 2 is a vertical cross sectional view taken on the line 2—2 of Figure 1.

Referring to the drawings, the improved fuel and air mixing valve is designated generally at 11 and comprises a main housing 12 which is provided at its top end with an air intake conduit portion 13 and at its bottom end with a fuel mixture discharge conduit portion 14, said portion 14 being formed with suitable horizontally extending lug elements 16 which are slotted, as shown at 17, so that the lug elements may be secured to a stationary support, for example, to the intake manifold of an internal combustion engine.

Figure 3:
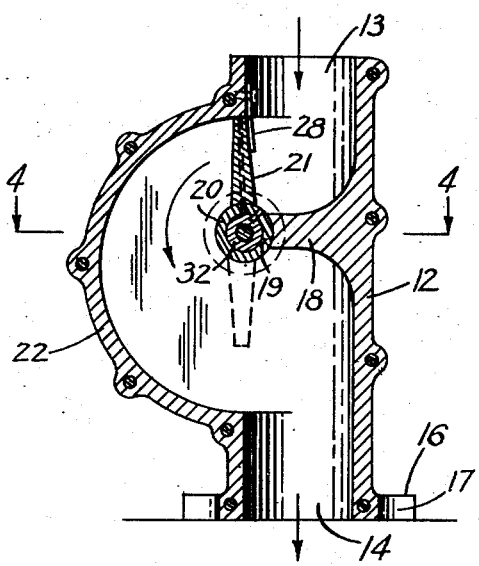
Figure 3 is a vertical cross sectional view taken on the line 3—3 of Figure 2.
Figure 4:
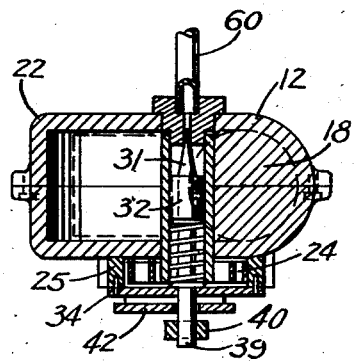
Figure 4 is a horizontal cross sectional view taken on the line 4—4 of Figure 3.

The housing 12 is formed with the horizontally extending partition portion 18 extending internally thereof between the conduit portions 13 and 14, as shown in Figures 3 and 4. Rotatably mounted in the housing transverse thereto and sealingly engaging the transverse edge 19 of partition member 18 is a sleeve 20 to which is secured a valve plate member 21, said valve plate member 21 extending radially from the sleeve member 20 and being rotatable with the sleeve 20 in a counterclockwise direction from the position thereof shown in Figure 3.

The housing 12 is formed with a semicylindrical wall portion 22 having a transverse axis spaced below the axis of the sleeve 20, the plate member 21 being of sufficient length to substantially interengage with the top portion of the inside surface of the semicylindrical housing element 22, as shown in Figure 3, but defining a passage having increasing clearance with respect to the inside surface of the semicylindrical housing element 22 as the valve plate 21 is rotated counterclockwise, as viewed in Figure 3, away from its full line, or substantially closed, position shown therein.

Figure 5:
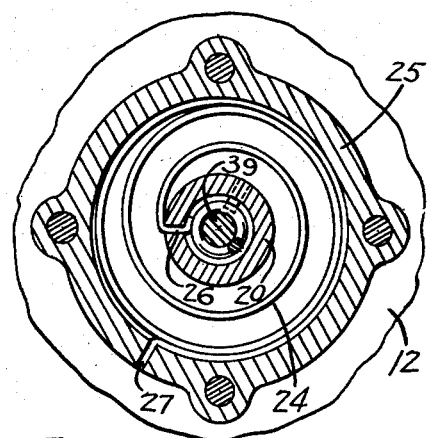
Figure 5 is an enlarged cross sectional detail view taken on the line 5—5 of Figure 2.
Figure 6:
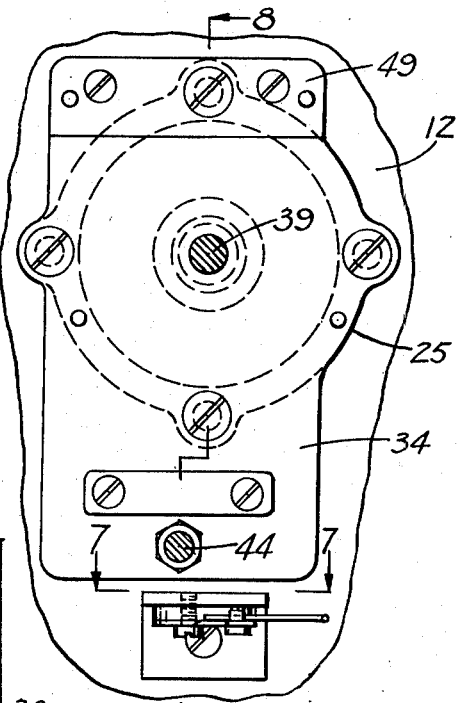
Figure 6 is an enlarged cross sectional detail view taken on the line 6—6 of Figure 2.

The plate 21 is biased clockwise, as viewed in Figure 3, by a spirally coiled spring 24 which is disposed in an auxiliary, circular housing 25 provided on the side wall of the main housing 12. As shown in Figure 5, one end of the spring 24 is anchored at 26 to the sleeve 20, whereas the outer end of the spring, shown at 27, is anchored in the wall of the auxiliary housing 25, whereby the sleeve 20 is biased in a clockwise direction, as viewed in Figure 5, whereby the plate 21 is biased toward its uppermost, or substantially closed position, shown in Figure 3. Designated at 28 is a depending stop plate which is secured to the inside wall of the conduit portion 13, to limit the clockwise rotation of the valve plate 21 to the position thereof shown in Figure 3.

Figure 8:
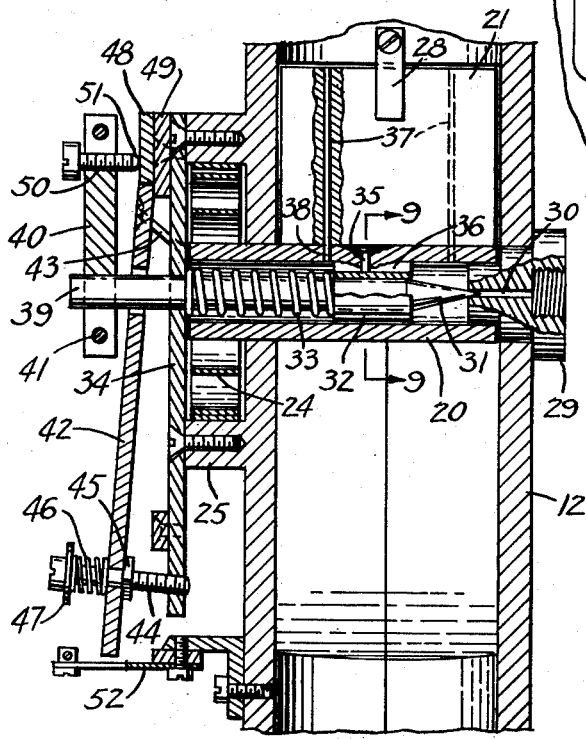
Figure 8 is a cross sectional view taken on the line 8—8 of Figure 6.

Designated at 29 is a conduit bushing which is secured in the wall of the main housing 12 and which extends into the end of the sleeve 20, defining a bearing for the sleeve, as shown in Figure 8, said bushing 29 having the fuel inlet port 30 extending axially into the sleeve 20. Rotatably and slidably positioned in the sleeve 20 is a needle valve 31 having a conical tip engageable in the end of the port 30. The valve 31 is formed with an enlarged portion 32 which is slidably and rotatably supported in the sleeve 20, a coiled spring 33 surrounding the shank of the needle valve 31, as shown in Figure 8, and bearing between the enlarged portion 32 and the cover plate 34 of the auxiliary housing 25, biasing the conical tip of the needle valve 31 into seating engagement in the port 30.

Designated at 35 is a pin element which is secured in the wall of sleeve 20 and which extends into a longitudinal groove 36 formed in the enlarged portion 32, whereby the needle valve 31 rotates simultaneously with the valve plate 21 but is slidable axially in the sleeve 20.

The plate 21 is formed with a pair of fuel discharge passages 37, 37 communicating with similar passages 38 formed in the sleeve 20, whereby liquid fuel or any other suitable fuel from the fuel port 30 enters the passages 38 and 37 and may be discharged from the edge of the plate 21 by the asperating action of air moving through the mixing valve past the edge of the plate 21 and through the clearance defined between the edge of plate 21 and the inside wall of the cylindrical element 22 of housing 12.

As shown in Figure 5, the needle valve 31 has the externally projecting shank portion 39 to the end of which is secured an arm 40 extending at right angles to the shank portion 39, as shown in Figure 8, said arm portion being formed with a suitable slot 41 receiving the shank portion 39 and being clamped thereto by a transverse clamping screw or bolt 41. Designated at 42 is an inclined cam plate which is yieldably secured at its upper end to the cover plate 34, as by the provision of a pair of resilient connecting pins 43 connecting the upper portions of the side margins of the plate 42 to the cover plate 34. An adjusting screw 44 extends rotatably through the lower portion of the plate 42 and threadedly engages the lower end portion of the cover plate 34; the screw 44 being provided with a collar element 45 which engages the inside surface of the plate 42. A coiled spring 46 surrounds the outer portion of the shank of screw 44, bearing between a washer 47 provided under the head of the screw 44 and the cam plate 42, whereby the inclination of the cam plate 42 may be adjusted by rotating the screw 44, whereby the spacing of the lower portion of plate 42 with respect to cover plate 34 may be varied while the pins 43 allow the plate 42 to pivot substantially around its top edge. The top edge of plate 42 is received in the recess defined by a pair of stepped block members 48 and 49 secured to the upper portion of main housing 12 adjacent the top of the auxiliary housing 25.

Threadedly engaged in the upper portion of arm 40, as viewed in Figure 8, namely, near the free end of arm portion 40, is an adjustable screw 50 which is provided at its end with a suitable spherical recess containing a bearing ball 51. The bearing ball 51 is engageable with the inclined cam plate 42 responsive to the rotation of the valve plate 21 and sleeve 20, whereby the needle valve 31 is moved away from the end of fuel admission bore 30 as plate 21 is rotated counterclockwise, as viewed in Figure 3, whereby the supply of fuel admitted into the device is increased in accordance with the increased air pressure acting on the valve plate 21 to rotate the plate away from its closed position.

Figure 7:
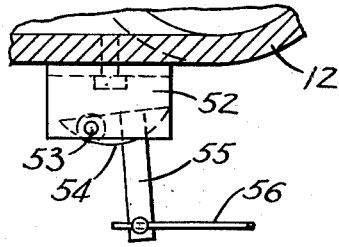
Figure 7 is a cross sectional detail view taken on the line 7—7 of Figure 6.
Figure 9:
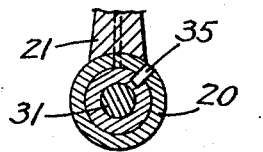
Figure 9 is a cross sectional detail view taken on the line 9—9 of Figure 8.

As will be readily understood, the inclination of the cam plate 42 will be normally adjusted in accordance with the working requirements of the internal combustion engine with which the device is employed, over its normal range of loading. However, in order to provide a richer mixture at times, for example, in starting the engine cold, means are provided for temporarily increasing the effective angle of inclination of the cam plate 42, to provide the richer mixture. Said means may comprise, for example, a bracket plate 52 secured horizontally to the lower portion of the main housing 12 subjacent the bottom edge of the cam plate 42. Pivoted at 53 to the bracket plate 52 is a cam-like arm 54 to which is secured an outwardly extending lug 55. The curved edge of the arm 54 is engageable with the lower marginal portion of the cam plate 42 responsive to the outward rotation of the arm 54. A control wire 56 is connected to the lug 55, as shown in Figure 7, said wire 56 extending to the vehicle instrument panel and being provided on its end with a choke button, whereby the operator of the vehicle may manually rotate the lug 55 and the choke cam 54 by manipulating wire 56 by means of its button. Thus, the cam 54 may be rotated to engage the lower margin of the plate 42, to flex said plate outwardly and to increase the angle of inclination of the plate 42 with respect to the cover plate 34, whereby the movement of the needle valve 31 will be temporarily increased as a result of a given degree of rotation of the valve plate 21, thereby providing the desired richer mixture.

The fuel mixture discharge outlet conduit 14 is provided with a conventional throttle valve mounted on a transverse shaft 57, shown in Figure 1, the shaft 57 being rotatable in the conduit portion 14 and being provided externally with an actuating arm 58 to which is connected a control wire 59 extending to a suitable control element on the vehicle for regulating the amount of the fuel and air mixture supplied to the intake manifold of the engine.

It will be understood that a fuel line 60 is connected to the fuel inlet bushing 29, whereby a supply of fuel is furnished to the device. The fuel supply conduit 60 is of course connected to the fuel tank through a suitable fuel pump, providing a substantially constant proper fuel pressure. It will be further understood that when the engine is started, suction will be developed which will cause air to rush through the air intake conduit 13 and act on the valve plate 21, rotating the valve plate 21 and thereby opening the needle valve 31 sufficiently to allow a proper amount of liquid fuel or any other suitable fuel to enter the mixing valve in the manner above explained. During operation of the engine, there will be a sufficient vacuum in the intake manifold to provide the required air pressure in the intake conduit 13 to maintain the valve plate 21 open against the force of the spiral biasing spring 24 and to allow a sufficient quantity of air to pass through the device so as to mix with the proper proportion of fuel to provide optimum performance of the engine at the particular speed and under the loading conditions then present.

While a specific embodiment of an improved fuel and air mixing valve for an internal combustion engine or for a similar device has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

In a fuel and air mixing valve, a main housing having an air intake conduit and a fuel mixture discharge conduit, a valve plate rotatably mounted in said housing and facing said air intake conduit, spring means biasing said plate toward closing position with respect to said air intake conduit, the interior of said housing being formed to define an arcuate passage eccentric with respect to the rotational axis of said plate and having increasing clearance with respect to said plate as said plate is rotated away from said closing position, said housing being formed with a fuel admission port and with passage means connecting said fuel admission port with the interior of the housing, a needle valve rotatably and slidably mounted in said housing coaxially with said plate and being engageable in said port, means biasing said needle valve into seating engagement with said port, an inclined cam plate externally and adjustably mounted on the housing extending around the axis of rotation of said valve plate, a follower arm rigidly connected to said needle valve and engaging said cam plate, said cam plate being arranged to act on said follower arm in a direction to move said needle valve away from said port responsive to the rotation of said valve plate away from said closing position, said needle valve being formed with a longitudinal groove, and a pin element connected to said valve plate and slidably engaging in said groove, mechanically coupling said needle valve to said valve plate for simultaneous rotation therewith.

References Cited in the file of this patent

UNITED STATES PATENTS

| | | |
|---|---|---|
| 1,126,127 | Swan | Jan. 26, 1915 |
| 1,611,347 | Hartwell | Dec. 21, 1926 |
| 2,710,604 | Snyder | June 14, 1955 |